July 27, 1926.
C. P. BYRNES
1,593,566
LINING FOR FURNACES AND THE LIKE
Filed Oct. 2, 1924
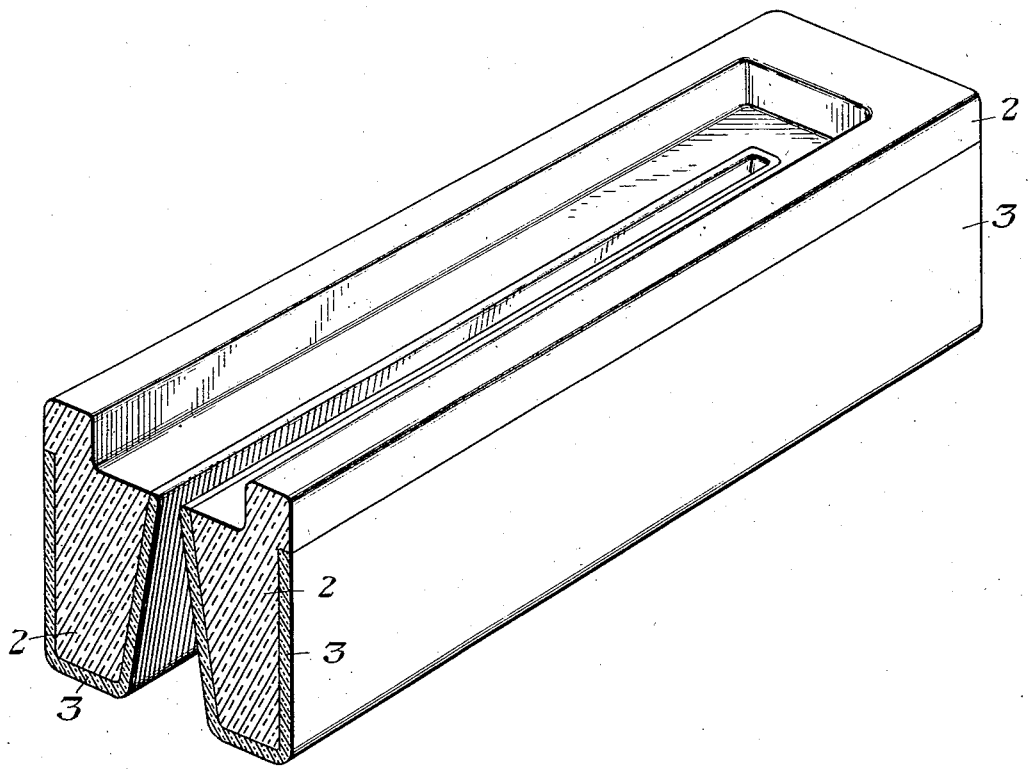
INVENTOR
Clarence P. Byrnes Patented July 27, 1926.

1,593,566

UNITED STATES PATENT OFFICE.

CLARENCE P. BYRNES, OF SEWICKLEY, PENNSYLVANIA.

LINING FOR FURNACES AND THE LIKE.

Application filed October 2, 1924. Serial No. 741,120.

The figure is a perspective view partly broken away, showing a block through which sheet glass is drawn constructed in accordance with my invention.

My invention relates to the linings of furnaces or vessels or parts thereof which are in contact with molten baths, such as used in steel and iron making, in glass making, etc., and is designed to provide a facing material therefor which is not materially attacked by the molten material under the temperatures imparted. The invention is especially intended for the linings of slots, orifices, etc. through which molten material, such as glass, is fed, as in glass feeders, rings from within which glass is drawn up in cylinder, sheet or other form etc.

In the system of forming sheet glass by drawing it in sheet, plate or cylinder form upwardly through slots or orifices in refractory blocks or floaters, the refractory material forming the walls of the slot chip and crack off, causing lines etc. on the glass thus drawn. The nozzles used in the downward feeding of glass are also injured correspondingly. In accordance with my invention, such parts are provided with a fused surfacing material, such as fused quartz, which will resist the bath action under the temperatures imparted to the walls of the orifice, and maintain its smooth surface. Fused carbide of tungsten may also be used for this purpose.

When glass is drawn up in sheet form through a long slot in a refractory block, the slot will be lined, especially as to those parts from which the glass leaves the block, with the facing material having a high melting point; higher than the temperature reached by it when in use, and resistant to cracking or chipping or spalling off under such conditions. The desired smoothness of surface is obtained by the melting of the material, as in its formation, though it may be mechanically worked thereafter, if desired. The desired form of the lining may be cast and the supporting refractory block molded about the lining, or the lining may be applied in any desirable way. The fused quartz also has the advantageous characteristic of a low expansion coefficient and will not discolor the glass when used in glass working. In the drawing, 2 represents the refactory clay portion of an ordinary drawing block such as used in the Fourcault machine, showing at 3 the fused quartz lining or covering where contact is had with the molten glass bath.

The blocks forming the walls of the glass melting or making furnace may also be faced with such material where they contact with the molten glass or molten bath, thus reducing the eating away of such walls and the entry of impurities into the bath. The blocks of such walls or the nozzle blocks made in accordance with my invention may be cooled, if desired, by any of the well known methods of air or water cooling. The nozzle block or other block which is used may also be made entirely of fused quartz and may be hollow for cooling connections, etc.

I claim:

1. A furnace having a built-up wall formed of blocks, at least part of said blocks having a fused silica face portion adapted to contact with fused bath materials contained in said furnace.

2. As a new article of manufacture, a block having a fused silica surface arranged to contact with fused bath material moving past it.

3. A shaping element for plastic glass having a fused silica surface for contact with moving glass.

4. As a new article of manufacture, a block having a fused silica surface arranged to contact with fused bath material moving past it, and means for cooling the block.

5. A shaping element for plastic glass having a fused silica surface for contact with moving glass, and means for cooling the shaping element.

6. As a new article of manufacture, a block having a working surface of substantially pure and non-porous fused silica.

7. As a new article of manufacture, a block having a working surface of substantially pure and non-porous fused silica.

8. As a new article of manufacture, an element for contacting with molten material comprising a surface portion of fused silica, and a backing portion of refractory material integral with the working portion.

9. As a new article of manufacture, a composite furnace block having a body portion formed of refractory material, and a face portion of fused silica, the face portion being integral with the body portion.

In testimony whereof I have hereunto set my hand.

CLARENCE P. BYRNES.